(12) United States Patent
Drachenberg et al.

(10) Patent No.: US 11,340,396 B2
(45) Date of Patent: May 24, 2022

(54) NON-CIRCULAR OPTICAL FIBER AND MODE SHAPE CONVERTER AND METHOD

(71) Applicant: Lawrence Livermore National Security, LLC, Livermore, CA (US)

(72) Inventors: Derrek R. Drachenberg, Livermore, CA (US); Graham S. Allen, Pleasanton, CA (US); Diana C. Chen, Fremont, CA (US); Matthew J. Cook, Brentwood, CA (US); Robert P. Crist, Tracy, CA (US); Jay W. Dawson, Livermore, CA (US); Leily Kiani, Napa, CA (US); Michael J. Messerly, Danville, CA (US); Paul H. Pax, Livermore, CA (US); Nick Schenkel, Livermore, CA (US); Charles X. Yu, Pleasanton, CA (US)

(73) Assignee: LAWRENCE LIVERMORE NATIONAL SECURITY, LLC, Livermore, CA (US)

( * ) Notice: Subject to any disclaimer, the term of this patent is extended or adjusted under 35 U.S.C. 154(b) by 0 days.

(21) Appl. No.: 16/626,947

(22) PCT Filed: Jul. 5, 2018

(86) PCT No.: PCT/US2018/040962
§ 371 (c)(1),
(2) Date: Dec. 27, 2019

(87) PCT Pub. No.: WO2019/032227
PCT Pub. Date: Feb. 14, 2019

(65) Prior Publication Data
US 2020/0132925 A1    Apr. 30, 2020

Related U.S. Application Data

(60) Provisional application No. 62/529,321, filed on Jul. 6, 2017.

(51) Int. Cl.
*G02B 6/028* (2006.01)
*G02B 6/12* (2006.01)
*G02B 6/42* (2006.01)

(52) U.S. Cl.
CPC ............ *G02B 6/0288* (2013.01); *G02B 6/12* (2013.01); *G02B 6/4202* (2013.01);
(Continued)

(58) Field of Classification Search
None
See application file for complete search history.

(56) References Cited

U.S. PATENT DOCUMENTS 5,696,865 A * 12/1997 Beeson ................ G02B 6/0281
385/146
6,324,326 B1 11/2001 Dejneka et al.
(Continued)

FOREIGN PATENT DOCUMENTS

WO    2019032227 A2    2/2019

OTHER PUBLICATIONS

International Search Report for PCT/US2018/040926, 3 pages.
(Continued)

*Primary Examiner* — Tina M Wong
(74) *Attorney, Agent, or Firm* — Perkins Coie LLP

(57) ABSTRACT

A class of fibers is described that have a non-circular cross section on one or both ends that can by optimized to capture the optical radiation from a laser diode or diode array and deliver the light in the same or different shape on the opposite end of the fiber. A large multimode rectangular waveguide may be provided which can accept the radiation from a high-power diode bar and transform it into a circular cross section on the opposite end, while preserving brightness.

32 Claims, 2 Drawing Sheets

(52) U.S. Cl.
CPC ............... *G02B 2006/1209* (2013.01); *G02B 2006/12102* (2013.01); *G02B 2006/12121* (2013.01)

(56) References Cited

U.S. PATENT DOCUMENTS

| | | | |
|---|---|---|---|
| 6,944,192 B2 | 9/2005 | Prassas et al. | |
| 7,477,828 B2* | 1/2009 | Turner | G02B 3/0087 385/146 |
| 8,515,220 B1 | 8/2013 | Khitrov et al. | |
| 9,535,217 B1 | 1/2017 | Farmer et al. | |
| 9,633,683 B2* | 4/2017 | Lee | G02B 6/136 |
| 2002/0172486 A1* | 11/2002 | Fermann | H01S 3/06708 385/128 |
| 2004/0114869 A1* | 6/2004 | Fike | G02B 6/131 385/43 |
| 2006/0274802 A1 | 12/2006 | Nomoto et al. | |
| 2007/0237453 A1* | 10/2007 | Nielsen | G02B 6/02338 385/28 |
| 2010/0247047 A1* | 9/2010 | Filippov | C03B 37/02763 385/127 |
| 2010/0278486 A1* | 11/2010 | Holland | G02B 6/262 385/43 |
| 2014/0209798 A1 | 7/2014 | Woodward et al. | |
| 2015/0086153 A1* | 3/2015 | Ono | G02B 6/12002 385/11 |
| 2015/0086157 A1 | 3/2015 | Fontaine et al. | |
| 2016/0327748 A1 | 11/2016 | Stern et al. | |
| 2020/0132925 A1* | 4/2020 | Drachenberg | G02B 6/0288 |

OTHER PUBLICATIONS

International Preliminary Report on Patentability and Written Opinion for PCT/US2018/040926, 6 pages.
Extended European Search Report issued in Application No. 18843162.1, dated Feb. 3, 2021, 10 pages.

* cited by examiner

NON-CIRCULAR OPTICAL FIBER AND MODE SHAPE CONVERTER AND METHOD

CROSS-REFERENCE TO RELATED APPLICATIONS

This application claims the benefit of U.S. Provisional Patent Application No. 62/529,321 titled "Non-Circular Optical Fiber and Mode Shape Converter for Collecting Optical Radiation from a Diode or an Array of Diodes," filed Jul. 6, 2017, incorporated herein by reference.

STATEMENT AS TO RIGHTS TO INVENTIONS MADE UNDER FEDERALLY SPONSORED RESEARCH OR DEVELOPMENT

The United States Government has rights in this invention pursuant to Contract No. DE-AC52-07NA27344 between the United States Department of Energy and Lawrence Livermore National Security, LLC, for the operation of Lawrence Livermore National Laboratory.

BACKGROUND

Field

The present technology relates to optical waveguides, and more specifically, it relates to fiber optics systems for collecting diode laser radiation. The present technology includes but is not limited to non-circular optical fiber and mode shape converter for collecting optical radiation from a diode or an array of diodes.

Description of Related Art

The rise in power of fiber lasers over the last several decades is primarily due to the rise in brightness of the diode lasers used to pump fiber lasers. However, the brightest individual diodes cannot produce more than a few watts of power, while fiber laser applications often call for 100 s or 1000 s of watts. In order to achieve higher power than a single emitter can produce, many emitters are stacked into a dense array designed to maintain brightness and the entire array is focused into the pump cladding of a fiber laser. However, diode bars and stacks of diode bars are not easily focused into a circular cladding with a radially uniform numerical aperture without losing brightness due to their asymmetric divergence in the slow vs fast axis and rectangular shape. Therefore, the light emitted from a diode stack is reshaped by a set of micro and macro lenses and mirrors designed to fit the light into a typical circular fiber cross-section. Most of the shaping optics can be eliminated by use of a non-circular fiber that has been designed to accept the diode light and deliver light in either the same non-circular shape or converting to a circular shape on the opposite end.

The pump claddings of high power fiber lasers and fiber coupled diodes typically have a circular cross-section, but non-circular cross sections, such as rectangular, can be required for certain applications. In this case, it can be a challenge to efficiently couple light from a fiber coupled pump diode array (with a circular cross-section) into the fiber laser with a non-circular pump cladding and the output beam needs to be re-shaped from a circular fiber cladding to a non-circular (rectangular for example) cladding to maintain brightness and efficiently pump the fiber. A fiber with a circular cross section on one end and a non-circular opposite end can be used to re-shape the output of an array of diodes to match a desired fiber, or to re-shape the output from a circular or non-circular fiber to match another circular or non-circular fiber.

Previous work by diode manufacturers has focused on free space lenses and diffractive optic schemes. The present invention would greatly simplify the free space portion of a fiber coupled diode package. Others have demonstrated fibers with a rectangular cross-section on one end and a circular cross section on the other, but only through the selective collapse of air holes which limits the approach to few-moded fibers that are not suitable for accepting highly multimode output from a diode bar or array.

Various schemes of mode conversion inside of a fiber have been demonstrated, such as the photonic crystal lanterns. However, photonic crystal lanterns typically convert from a set of single mode inputs to modes of a multimode Output which is not compatible with collecting the light from a highly asymmetric high-power diode bar.

SUMMARY

The present technology presents a class of fibers with a non-circular cross section on one or both ends that can by optimized to capture the optical radiation from a laser diode or diode array and deliver the light in the same or different shape on the opposite end of the fiber. For example, a large multimode rectangular waveguide may be provided which can accept the radiation from a high-power diode bar and transform it into a circular cross section on the opposite end. Presently, diode arrays intended to pump fiber lasers are typically coupled into optical fibers by a set of complex and expensive beam shaping optics that convert the rectangular cross section and angular content of the diode array into the circular cross section and angular content of the fiber. The present technology enables directly coupling the emission from a rectangular diode array into an optical fiber designed to accept it without significant loss of brightness, only requiring simple collimating and/or focusing optics. In some cases, the rectangular fiber used to collect the diode light can be used directly to pump a fiber laser with a rectangular pump cladding. However, in most cases, a fiber laser pump cladding has a circular cross section. In these cases, the pump coupling fiber of the present invention can be made to reshape the beam from one end to the other without significant loss of brightness. Two example embodiment fiber devices are provided to accomplish the desired collection, conversion, and delivery of the diode light. The first example embodiment device is a fiber with a rectangular outer shape that has been matched to the diode and a numerical aperture that exceeds that required to accept the beam. This fiber would be heated and tapered adiabatically until the outside shape became circular. The second example embodiment device is made by embedding a rectangular waveguide, matched to the diode, inside of a circular waveguide, matched to the fiber laser pump cladding. After sufficient tapering, the light populating the modes of the rectangular waveguide adiabatically transfer to the modes of the circular waveguide.

Some uses of the invention may include, for example, (1) efficient collection of light from diode bars and arrays of diode bars, and (2) efficient delivery of optical radiation from diodes to circular or non-circular shaped fibers. The invention relates to tapered fibers, pump couplers, photonic crystal lanterns and rectangular fibers.

BRIEF DESCRIPTION OF THE DRAWINGS

The accompanying drawings, which are incorporated into and form a part of the disclosure, illustrate embodiments of the invention and, together with the description, serve to explain the principles of the invention.

DETAILED DESCRIPTION

Figure 1:
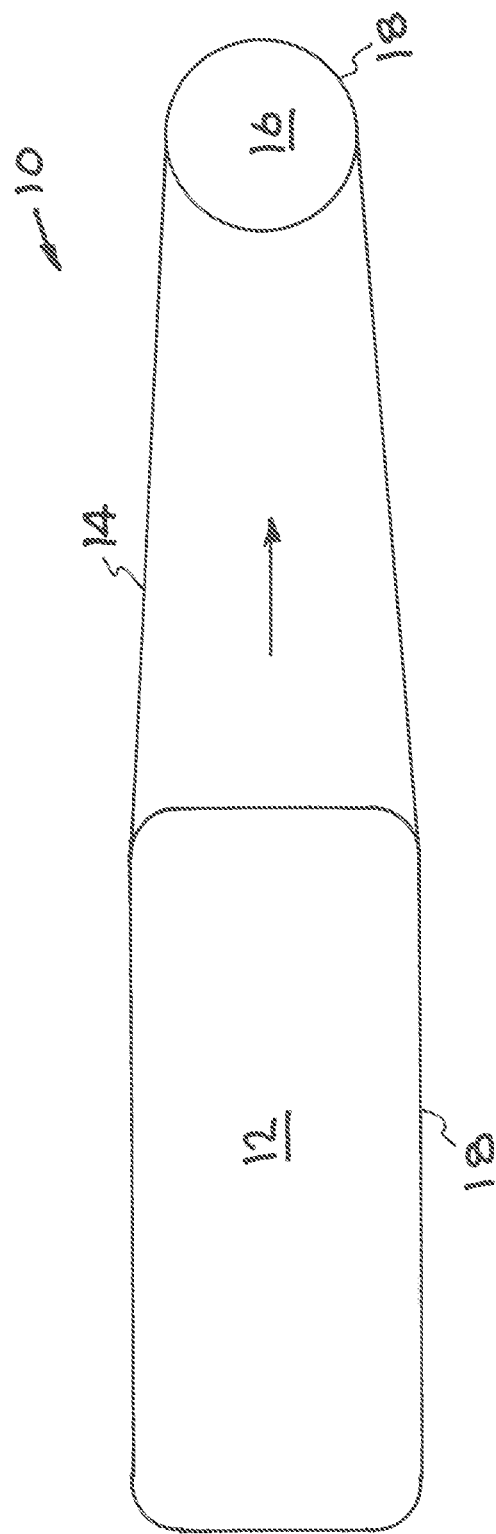
FIG. 1 illustrates a polymer clad fiber with a rectangular cross section tapered down to a polymer clad fiber with a circular cross-section.

Generally, the invention provides at least a convenient means of redistributing intensity in both spatial and angular domains in such a way as to preserve brightness. The brightness of an intensity distribution is inversely proportional to the product of its two-dimensional extents in space and angle. Perfect imaging systems preserve brightness but the one-to-one mapping inherent in imaging limits the types of reshaping of an intensity distribution, e.g., anamorphic or astigmatic transformations. Non-imaging optical systems, e.g., Compound Parabolic Concentrators, can also be brightness preserving but are not suitable for high aspect ratio situations. Light pipes can transport intensity with negligible loss of either power or brightness and can also transform the intensity distribution under limited conditions; in particular, redistributing an asymmetric intensity distribution to a symmetric one requires that the input underfill the maximum acceptance angle of the pipe. Finally Photonics Crystal Lanterns can transform an intensity distribution while preserving brightness, by effecting couplings amongst the modes of a tapered but otherwise arbitrary few-moded (typically less than 100) waveguide. The tapering is constrained to be adiabatic, that is, gradual with respect to the evolution of the modes; and is typically slight, being on the order of 10% or less, i.e., a reduction in diameter from 100% to 90%. Photonic Crystal Lanterns can be considered as waveguide couplers with variation in the propagation direction, with an input (or source) and output (or target) waveguides.

The present invention extends the Photonic Crystal Lantern by considering, waveguides supporting many modes (typically greater that 10,000) and much more substantial tapering. For the embodiment of FIG. 1, described below, the minimum tapering can be 2:1, i.e., a reduction in diameter from 100% to 50%. In the embodiment of FIG. 2, described below, the tapering can be 10:1 or greater, i.e., a reduction in diameter from 100% to 10%. In some embodiments, the source waveguide is tapered enough that all its modes but the fundamental have lost guidance by the end of the taper, with these modes being captured by the target waveguide. The capture of the modes lost by the source waveguide is most effective if the source is embedded in the target waveguide; but the source and target waveguides could be separate structures provided they are strongly evanescently coupled. Furthermore, the source need not have its own waveguiding structure, it could instead be comprised of light launched into a small subset of the modes of the target structure.

More specifically, the invention is at least directed to a device to directly collect the optical radiation from a laser diode bar or a stack of laser diode bars, having a "fast" single mode axis, and a "slow" multimode axis, into an optical fiber. In some embodiments, the optical radiation is subsequently converted in the fiber to a circular cross section if needed. Rather than transforming the asymmetric diode emission to fit into an optical fiber with a circular cross-section, the fiber would be designed to match the angular and spatial content of the diode bar or stack. The only optics required would be a cylindrical lens and a simple focusing optic.

Figure 2:
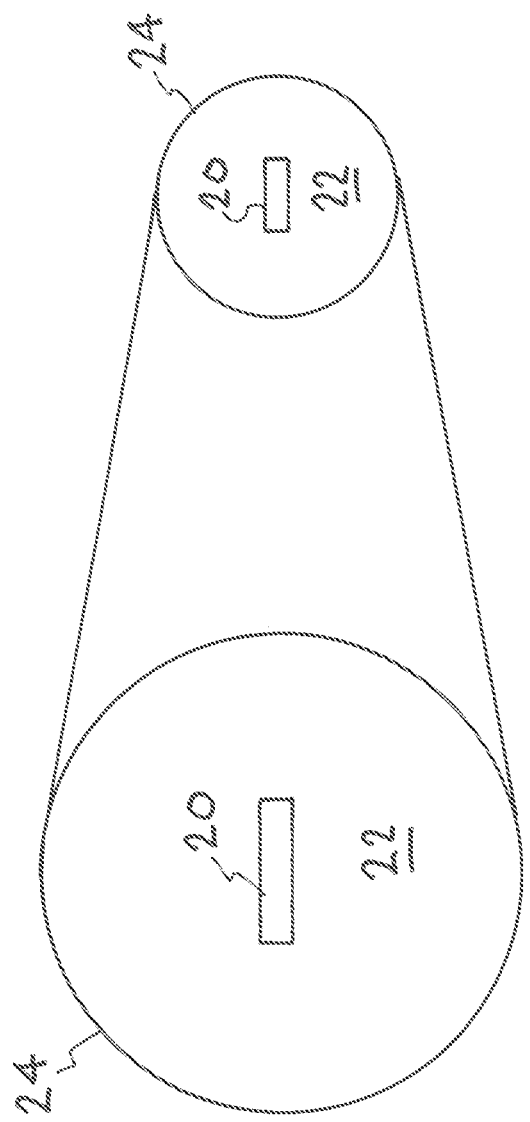
FIG. 2 illustrates a rectangular waveguide embedded inside a circular waveguide with a polymer clad for full coupling of light from a rectangular diode bar and tapered to convert to a circular pump cladding.

FIG. 1 shows a first example embodiment of the device of the present invention. In this embodiment, properly preconditioned light is launched into a subset of the angular distribution of a waveguide that is matched in its spatial cross-section to the input light, e.g., a rectangular waveguide for the rectangular intensity distribution from a laser diode bar or stack. The source substantially fills the waveguide's spatial extent, but underfills it's angular extent; the underfilling allows for that asymmetric input to be mixed and redistributed to the symmetric output distribution. The device calls for a fiber 10 to be made with a rectangular cross section 12. A taper 14 is used to convert the rectangle to a circle 16. The cladding 18 of the fiber can be, e.g., glass embedded inside the fiber or can be, e.g., polymer coated on the outside of the fiber. A simple cylindrical lens acting on the fast axis of a diode would match the divergence angle between the fast and slow axes. After the divergence angles have been matched, a simple focusing lens or lens pair would focus the light into the rectangular acceptance fiber. In order to circularize the modes on the opposite side of the fiber, the rectangular fiber will need to be tapered at high temperature until the opposite end becomes circular. This can be done by heating a fiber while applying tension. In order to circularize the fiber, a taper reducing the size significantly will be required. The taper region must be over a relatively long length (100 mm for example) to make sure the transition is adiabatic. To prevent the light from leaking through the taper region, it is important that all of the illuminated modes in the large rectangular end can fit within the small circular end of the fiber. The numerical aperture of a polymer clad fiber can be higher than 0.4. The input end of the fiber should be large enough that the numerical aperture of the launched beam would fit within only a fraction of the available numerical aperture space, for example numerical aperture launch=0.1. Then, when passing through the taper region, the low order modes of the fiber can be adiabatically transitioned to the new shape. If, however, some modes that are supported in the larger waveguide are cutoff in mode space (angular or spatial) by the taper, the power in these modes will be lost. If, the input angular launch spectrum and fiber size are chosen such that the launched brightness is lower than or equal to the final tapered fiber brightness, then no loss in brightness should occur. Thus, FIG. 1 illustrates a polymer clad fiber with a rectangular cross section tapered down to a polymer clad fiber with a circular cross-section.

In a method for fabricating the embodiment of FIG. 1, a fiber, which is on the scale of 100-500 μm in diameter, is drawn from a preform, which is on the scale of 5-100 mm in diameter. The preform for the rectangular fiber of FIG. 1 can be fabricated by the stack and draw method in which a set of 1-3 mm canes is stacked in an array and inserted into a tube. To make this preform rectangular, the array can be made to be rectangular and inserted into a rectangular tube. This can also be done by grinding a standard circular preform into a rectangular shape. After the desired outer shape is achieved, a low index polymer can form the pump cladding, or in the case of the stack and draw technique, a glass pump cladding could be stacked into the preform. Whether glass or polymer, a pump cladding must simply exhibit a refractive index lower than that of the waveguide region. Once a preform of the desired internal features and external shape is constructed, the preform can be drawn in the standard way into a rectangular fiber.

FIG. 2 shows a second example embodiment of the device of the present invention. In this embodiment, properly pre-conditioned light is launched into a distinct source waveguide embedded in the larger target waveguide. The source underfills both the spatial and angular extents of the target waveguide. This structure is more complicated and has material constraints dictated by its two waveguides, but its greater underfilling affords more control on the intensity redistribution. The device calls for a rectangular waveguide 20 to be embedded inside a secondary circular waveguide 22 with an outer cladding 24. This can be accomplished by the stack and draw method as already described above. In this case, an array of canes (1-3 mm diameter) would be stacked into a hexagonal pattern. In the center of the array a set of canes would form a waveguide in a rectangular shape by doping the core with Ge or other high index dopant, or by doping the surrounding canes with F or with a low index dopant. In either case, a set of canes is chosen such that the aspect ratio matches that of the diode array beam or fiber that needs be coupled to. The rectangular waveguide should be large enough on one end to accept the desired diode light, but the whole fiber should be tapered on the opposite end sufficiently that the light from the embedded rectangular waveguide will leak (or couple) out into the circular waveguide. The embedded rectangular waveguide is necessarily made from glass, but the secondary circular waveguide can be made from glass or from a low index polymer. An NA of 0.22 can be reasonably achieved by use of Ge or F to raise the index of the waveguide core or to lower the index of the waveguide cladding respectively. Similar to the first example embodiment, a cylindrical lens can be used in the fast axis to match the slow and fast axis divergences, and a follow on focusing lens or lens set can focus the diode light onto the rectangular waveguide. After light has been coupled to the un-tapered end, it will pass through the tapered region. The low order modes of the embedded waveguide will map to the low order modes of the secondary circular waveguide in a process similar to that of a photonic crystal lantern. In this way, no brightness is lost. Thus, FIG. 2 shows a rectangular waveguide embedded inside a circular waveguide with a polymer clad. The waveguide is sized on the input end to accept light from a rectangular diode bar and tapered to convert to a circular pump cladding on the output end.

Although the description above contains many details and specifics, these should not be construed as limiting the scope of the invention but as merely providing illustrations of some of the presently preferred embodiments of this invention. Other implementations, enhancements and variations can be made based on what is described and illustrated in this patent document. The features of the embodiments described herein may be combined in all possible combinations of methods, apparatus, modules, systems, and computer program products. Certain features that are described in this patent document in the context of separate embodiments, can also be implemented in combination in a single embodiment. Conversely, various features that are described in the context of a single embodiment can also be implemented in multiple embodiments separately or in any suitable sub combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described above should not be understood as requiring such separation in all embodiments.

All elements, parts and steps described herein are preferably included. It is to be understood that any of these elements, parts and steps may be replaced by other elements, parts and steps or deleted altogether as will be obvious to those skilled in the art.

Broadly, this writing discloses at least the following: A class of fibers is described that have a non-circular cross section on one or both ends that can by optimized to capture the optical radiation from a laser diode or diode array and deliver the light in the same or different shape on the opposite end of the fiber. A large multimode rectangular waveguide may be provided which can accept the radiation from a high-power diode bar and transform it into a circular cross section on the opposite end, while preserving brightness.

Concepts:

This writing also presents at least the following concepts:

1. An apparatus, comprising:

a multimode central waveguide having a first index of refraction $n_1$ and having an input aperture and an output aperture, wherein said input aperture is non-circular and larger than an input laser beam directed into said input aperture, wherein said input laser beam at said input aperture produces an input brightness and an input spatial and angular distribution; and a cladding surrounding said central waveguide, wherein said cladding has a second index of refraction $n_2$, wherein $n_1 > n_2$, wherein said central waveguide and said cladding together comprise a taper along their length that redistributes said input spatial and angular distribution to produce a redistributed spatial and angular distribution at said output aperture and maintains at least 90% of said input brightness at said output aperture.

2. The apparatus of concepts 1 and 3-23, wherein said taper maintains at least 95% of said input brightness at said output aperture.

3. The apparatus of concepts 1, 2 and 4-23 wherein said taper maintains at least 99% of said input brightness at said output aperture.

4. The apparatus of concepts 1-3 and 5-23, wherein said multimode central waveguide will support at least 100 modes.

5. The apparatus of concepts 1-4 and 6-23, wherein said multimode central waveguide will support at least 10,000 modes.

6. The apparatus of concepts 1-5 and 7-14 and 18-23, wherein said cladding is in direct contact with said central waveguide.

7. The apparatus of concepts 1-6 and 8-23, further comprising a laser for providing said laser beam, wherein said laser beam has a non-circular cross-section.

8. The apparatus of concepts 1-7, 9-14 and 18-23, wherein said input aperture has a rectangular cross-section, wherein said output aperture has a circular cross-section and wherein said cladding is in direct contact with said waveguide.

9. The apparatus of concept 8, wherein said input aperture has an angular distribution that is greater than that of the input laser beam.

10. The apparatus of concepts 1-9 and 11-23, further comprising a laser for providing said laser beam, wherein said laser beam has a rectangular cross-section.

11. The apparatus of concepts 1-10 and 12-23, wherein said laser beam comprises a fast axis and a slow axis, the apparatus further comprising a cylindrical lens and a focusing lens, wherein said cylindrical lens is configured to act on said fast axis so that it matches the divergence angle between said fast axis and said slow axis and wherein said focusing lens is configured to then focus said laser beam onto said input aperture.

12. The apparatus of concepts 1-11 and 13-23, wherein said laser beam comprises a fast axis and a slow axis, the apparatus further comprising a cylindrical lens and a focusing lens pair, wherein said cylindrical lens is configured to act on said fast axis so that it matches the divergence angle between said fast axis and said slow axis and wherein said focusing lens pair is configured to then focus said laser beam onto said input aperture.

13. The apparatus of concepts 142 and 14-23, wherein said taper is long enough to make said redistributed spatial and angular distribution to be adiabatic.

14. The apparatus of concepts 143 and 15-23, wherein said taper provides a reduction in diameter of said waveguide of a least 50%.

15. The apparatus of concepts 1-5, 7, 1043 and 16-23 further comprising a peripheral waveguide surrounding and in direct contact with said central waveguide, wherein said cladding surrounds and is in direct contact with said peripheral waveguide, wherein said peripheral waveguide comprises a third index of refraction $n_3$, wherein $n_1 > n_3 > n_2$.

16. The apparatus of concept 15, wherein said input aperture has a rectangular cross-section and wherein said peripheral waveguide has a circular cross-section at said input aperture and at said output aperture.

17. The apparatus of concept 16, wherein said input aperture has a spatial distribution and an angular distribution that are both greater than that of the input laser beam.

18. The apparatus of concept 1-17 and 19-23, further comprising a laser for providing said laser beam, wherein said laser beam has a rectangular cross-section.

19. The apparatus of concept 18, wherein said laser beam comprises a fast axis and a slow axis, the apparatus further comprising a cylindrical lens and a focusing lens, wherein said cylindrical lens is configured to act on said fast axis so that it matches the divergence angle between said fast axis and said slow axis and wherein said focusing lens is configured to then focus said laser beam onto said input aperture.

20. The apparatus of concept 18, wherein said laser beam comprises a fast axis and a slow axis, the apparatus further comprising a cylindrical lens and a focusing lens pair, wherein said cylindrical lens is configured to act on said fast axis so that it matches the divergence angle between said fast axis and said slow axis and wherein said focusing lens pair is configured to then focus said laser beam onto said input aperture.

21. The apparatus of concepts 15-48, wherein said taper is long enough to make said redistributed spatial and angular distribution to be adiabatic.

22. The apparatus of concepts 1-21 and 23, wherein said taper provides a reduction in diameter of said core of a least 90%.

23. The apparatus of concept 16, wherein said taper is configured such that said input brightness will couple out into said peripheral core by the time it reaches said output aperture.

24. A method, comprising:
providing an apparatus including (i) a multimode central waveguide having a first index of refraction $n_1$ and having an input aperture and an output aperture, wherein said input aperture is non-circular and larger than an input laser beam directed into said input aperture, wherein said input laser beam at said input aperture produces an input brightness and an input spatial and angular distribution; and (ii) a cladding surrounding said central waveguide, wherein said cladding has a second index of refraction $n_2$, wherein $n_1 > n_2$, wherein said central waveguide and said cladding together comprise a taper along their length that redistributes said input spatial and angular distribution to produce a redistributed spatial and angular distribution at said output aperture and maintains at least 90% of said input brightness at said output aperture; and
directing said input laser beam into said input aperture, wherein said taper redistributes said input spatial and angular distribution to produce said redistributed spatial and angular distribution at said output aperture and maintains at least 90% of said input brightness at said output aperture.

25. The method of concepts 24 and 26-46, wherein said taper maintains at least 95% of said input brightness at said output aperture.

26. The method of concepts 24, 25 and 27-46, wherein said taper maintains at least 99% of said input brightness at said output aperture.

27. The method of concepts 24-26 and 28-46, wherein said multimode central waveguide will support at least 100 modes.

28. The method of concepts 24-27 and 29-46, wherein said multimode central waveguide will support at least 10,000 modes.

29. The method of concepts 24-28, 30-37 and 41-46, wherein said cladding is in direct contact with said waveguide.

30. The method of concepts 24-29 and 31-46, further comprising providing a laser for providing said laser beam, wherein said laser beam has a non-circular cross-section 31. The method of concepts 24-30, 31-37 and 41-46, wherein said input aperture has a rectangular cross-section, wherein said output aperture has a circular cross-section and wherein said cladding is in direct contact with said waveguide.

32. The method of concepts 24-31, wherein said input aperture has an angular distribution that is greater than that of the input laser beam.

33. The method of concepts 24-32, 34-46, further comprising providing a laser for providing said laser beam, wherein said laser beam has a rectangular cross-section.

34. The method of concepts 24-33 and 35-46, wherein said laser beam comprises a fast axis and a slow axis, the method further comprising a cylindrical lens and a focusing lens, wherein said cylindrical lens is configured to act on said fast axis so that it matches the divergence angle between said fast axis and said slow axis and wherein said focusing lens is configured to then focus said laser beam onto said input aperture.

35. The method of concepts 24-34 and 36-46, wherein said laser beam comprises a fast axis and a slow axis, the method further comprising a cylindrical lens and a focusing lens pair, wherein said cylindrical lens is configured to act on said fast axis so that it matches the divergence angle between said fast axis and said slow axis and wherein said focusing lens pair is configured to then focus said laser beam onto said input aperture.

36. The method of concepts 24-35 and 37-46, wherein said taper is long enough to make said redistributed spatial and angular distribution to be adiabatic.

37. The method of concepts 24-36 and 38-46, wherein said taper provides a reduction in diameter of said waveguide of a least 50%.

38. The method of concepts 24-28, 30, 32-37 and 40-46, wherein said apparatus further comprises a peripheral waveguide surrounding and in direct contact with said central waveguide, wherein said cladding surrounds and is in direct contact with said peripheral waveguide, wherein said peripheral waveguide comprises a third index of refraction $n_3$, wherein $n_1 > n_3 > n_2$.

39. The method of concept 38, wherein said input aperture has a rectangular cross-section and wherein said peripheral waveguide has a circular cross-section at said input aperture and at said output aperture.

40. The method of concept 24-28, 30, 33-39 and 41-46, wherein said input aperture has a spatial distribution and an angular distribution that are both greater than that of the input laser beam.

41. The method of concepts 24-40 and 42-46, further comprising a laser for providing said laser beam, wherein said laser beam has a rectangular cross-section.

42. The method of concepts 24-41 and 43-46, wherein said laser beam comprises a fast axis and a slow axis, the method further comprising providing a cylindrical lens and a focusing lens, wherein said cylindrical lens is configured to act on said fast axis so that it matches the divergence angle between said fast axis and said slow axis and wherein said focusing lens is configured to then focus said laser beam onto said input aperture.

43. The method of concepts 24-42 and 44-46, wherein said laser beam comprises a fast axis and a slow axis, the method further comprising providing a cylindrical lens and a focusing lens pair, wherein said cylindrical lens is configured to act on said fast axis so that it matches the divergence angle between said fast axis and said slow axis and wherein said focusing lens pair is configured to then focus said laser beam onto said input aperture.

44. The method of concepts 24-43, 45 and 46, wherein said taper is long enough to make said redistributed spatial and angular distribution to be adiabatic.

45. The method of concepts 24-44 and 46, wherein said taper provides a reduction in diameter of said core of a least 90%.

46. The method of concept 39, wherein said taper is configured such that said input brightness will couple out into said peripheral core by the time it reaches said output aperture.

The foregoing description of the invention has been presented for purposes of illustration and description and is not intended to be exhaustive or to limit the invention to the precise form disclosed. Many modifications and variations are possible in light of the above teaching. The embodiments disclosed were meant only to explain the principles of the invention and its practical application to thereby enable others skilled in the art to best use the invention in various embodiments and with various modifications suited to the particular use contemplated. The scope of the invention is to be defined by the following claims.

We claim:

1. An apparatus, comprising:
a multimode central waveguide consisting of a single fiber having a first index of refraction m and having an input aperture and an output aperture, wherein said input aperture is non-circular and larger than an input laser beam received by said input aperture, wherein said input laser beam at said input aperture comprises a plurality of modes and produces an input brightness and an input spatial and angular distribution; and
a cladding surrounding said central waveguide, wherein said cladding has a second index of refraction $n_2$, wherein $n_1 > n_2$, wherein said central waveguide and said cladding together comprise a taper along their length, wherein said taper is configured to redistribute said input spatial and angular distribution and to allow all modes other than the fundamental or low order modes of the input laser beam to be eliminated at said output aperture.

2. The apparatus of claim 1, wherein said taper maintains one of at least 95% of said input brightness at said output aperture or at least 99% of said input brightness at said output aperture.

3. The apparatus of claim 1, wherein said multimode central waveguide will support one of at least 100 modes or at least 10,000 modes.

4. The apparatus of claim 1, wherein said cladding is in direct contact with said central waveguide.

5. The apparatus of claim 1, further comprising a laser for providing said laser beam, wherein said laser beam has a non-circular cross-section.

6. The apparatus of claim 1, wherein said input aperture has a rectangular cross-section, wherein said output aperture has a circular cross-section and wherein said cladding is in direct contact with said waveguide.

7. The apparatus of claim 6, wherein said input aperture has an angular distribution that is greater than that of the input laser beam.

8. The apparatus of claim 1, wherein said laser beam comprises a fast axis and a slow axis, the apparatus further comprising a cylindrical lens and at least one of a focusing lens or a focusing lens pair, wherein said cylindrical lens is configured to act on said fast axis so that it matches the divergence angle between said fast axis and said slow axis and wherein said focusing lens or said focusing lens pair is configured to then focus said laser beam onto said input aperture.

9. The apparatus of claim 1, wherein said taper is long enough to make said redistributed spatial and angular distribution to be adiabatic.

10. The apparatus of claim 1, wherein said taper provides a reduction in diameter of said waveguide of at least 50%.

11. The apparatus of claim 1, further comprising a peripheral waveguide surrounding and in direct contact with said central waveguide, wherein said cladding surrounds and is in direct contact with said peripheral waveguide, wherein said peripheral waveguide comprises a third index of refraction $n_3$, wherein $n_1 > n_3 > n_2$.

12. The apparatus of claim 11, wherein said input aperture has a rectangular cross-section and wherein said peripheral waveguide has a circular cross-section at said input aperture and at said output aperture.

13. The apparatus of claim 12, wherein said input aperture has a spatial distribution and an angular distribution that are both greater than that of the input laser beam.

14. The apparatus of claim 1, further comprising a laser for providing said laser beam, wherein said laser beam has a rectangular cross-section, wherein said laser beam comprises a fast axis and a slow axis, the apparatus further comprising a cylindrical lens and one of a focusing lens or a focusing lens pair, wherein said cylindrical lens is configured to act on said fast axis so that it matches the divergence angle between said fast axis and said slow axis and wherein said focusing lens or focusing lens pair is configured to then focus said laser beam onto said input aperture.

15. The apparatus of claim 12, wherein said taper is configured such that said input brightness will couple out into said peripheral core by the time it reaches said output aperture.

16. A method, comprising:
providing an apparatus including (i) a multimode central waveguide consisting of a single fiber having a first index of refraction $n_1$ and having an input aperture and an output aperture, wherein said input aperture is non-circular and larger than an input laser beam directed into said input aperture, wherein said input laser beam at said input aperture produces an input brightness and an input spatial and angular distribution; and (ii) a cladding surrounding said central waveguide, wherein said cladding has a second index of refraction $n_2$, wherein $n_1 > n_2$, wherein said central waveguide and said cladding together comprise a taper along their length that redistributes said input spatial and angular distribution and to allow all modes other than the fundamental or low order modes of the input laser beam to be eliminated at said output aperture; and
directing said input laser beam into said input aperture, wherein said taper redistributes said input spatial and angular distribution.

17. The method of claim 16, wherein said taper maintains one of at least 95% of said input brightness at said output aperture or at least 99% of said input brightness at said output aperture.

18. The method of claim 16, wherein said multimode central waveguide will support one of at least 100 modes or at least 10,000 modes.

19. The method of claim 16, wherein said cladding is in direct contact with said waveguide.

20. The method of claim 16, further comprising providing a laser for providing said laser beam, wherein said laser beam has a non-circular cross-section.

21. The method of claim 16, wherein said input aperture has a rectangular cross-section, wherein said output aperture has a circular cross-section and wherein said cladding is in direct contact with said waveguide.

22. The method of claim 21, wherein said input aperture has an angular distribution that is greater than that of the input laser beam.

23. The method of claim 16, wherein said laser beam comprises a fast axis and a slow axis, the method further comprising providing a cylindrical lens at least one of and a focusing lens or a focusing lens pair, wherein said cylindrical lens is configured to act on said fast axis so that it matches the divergence angle between said fast axis and said slow axis and wherein said focusing lens or said focusing lens pair is configured to then focus said laser beam onto said input aperture.

24. The method of claim 16, wherein said taper is long enough to make said redistributed spatial and angular distribution to be adiabatic.

25. The method of claim 16, wherein said taper provides a reduction in diameter of said waveguide of at least 50%.

26. The method of claim 16, wherein said apparatus further comprises a peripheral waveguide surrounding and in direct contact with said central waveguide, wherein said cladding surrounds and is in direct contact with said peripheral waveguide, wherein said peripheral waveguide comprises a third index of refraction $n_3$, wherein $n_1 > n_3 > n_2$.

27. The method of claim 26, wherein said input aperture has a rectangular cross-section and wherein said peripheral waveguide has a circular cross-section at said input aperture and at said output aperture.

28. The method of claim 27, wherein said input aperture has a spatial distribution and an angular distribution that are both greater than that of the input laser beam.

29. The method of claim 16, further comprising a laser for providing said laser beam, wherein said laser beam has a rectangular cross-section, wherein said laser beam comprises a fast axis and a slow axis, the apparatus further comprising a cylindrical lens and one of a focusing lens or a focusing lens pair, wherein said cylindrical lens is configured to act on said fast axis so that it matches the divergence angle between said fast axis and said slow axis and wherein said focusing lens or focusing lens pair is configured to then focus said laser beam onto said input aperture.

30. The method of claim 27, wherein said taper is configured such that said input brightness will couple out into said peripheral core by the time it reaches said output aperture.

31. The apparatus of claim 1, wherein said taper is configured to allow some of the plurality of the modes at said input aperture to be cut off by the taper.

32. The apparatus of claim 1, wherein said taper is shaped to provide a reduction in diameter in the range 2-to-1 to 10-to-1.

* * * * *